(12) United States Patent
Winokur

(10) Patent No.: US 7,984,327 B2
(45) Date of Patent: *Jul. 19, 2011

(54) FAST DATA RECOVERY SYSTEM

(75) Inventor: Alex Winokur, Haifa (IL)

(73) Assignee: Axxana (Israel) Ltd., Tel Aviv (IL)

( * ) Notice: Subject to any disclaimer, the term of this patent is extended or adjusted under 35 U.S.C. 154(b) by 315 days.

This patent is subject to a terminal disclaimer.

(21) Appl. No.: 12/228,315

(22) Filed: Aug. 11, 2008

(65) Prior Publication Data

US 2009/0094425 A1    Apr. 9, 2009

Related U.S. Application Data

(60) Provisional application No. 60/978,278, filed on Oct. 8, 2007.

(51) Int. Cl.
*G06F 11/00* (2006.01)
*G06F 13/00* (2006.01)

(52) U.S. Cl. ......... 714/6.2; 714/4.1; 711/114; 710/104

(58) Field of Classification Search ............ 714/4, 6; 711/114; 710/104
See application file for complete search history.

(56) References Cited

U.S. PATENT DOCUMENTS

| | | | |
|---|---|---|---|
| 5,027,104 A | 6/1991 | Reid | |
| 5,546,533 A | 8/1996 | Koyama | |
| 5,594,900 A | 1/1997 | Cohn et al. | |
| 5,623,597 A | 4/1997 | Kikinis | |
| 5,724,501 A * | 3/1998 | Dewey et al. | 714/5.11 |
| 5,799,141 A | 8/1998 | Galipeau et al. | |
| 5,841,768 A * | 11/1998 | Ozluturk et al. | 370/335 |
| 5,889,935 A | 3/1999 | Ofek et al. | |
| 6,105,078 A | 8/2000 | Crockett et al. | |
| 6,144,999 A | 11/2000 | Khalidi et al. | |
| 6,158,833 A | 12/2000 | Engler | |

(Continued)

FOREIGN PATENT DOCUMENTS

CN    1495612 A    5/2004

(Continued)

OTHER PUBLICATIONS

Russian Patent Application No. 2007141777 Official Action dated May 6, 2009.

(Continued)

*Primary Examiner* — Robert W Beausoliel, Jr.
*Assistant Examiner* — Jeison C Arcos
(74) *Attorney, Agent, or Firm* — D. Kligler IP Services Ltd.

(57) ABSTRACT

A data processing method includes receiving data objects for storage by a primary storage device. A first instance of each of at least some of the received data objects is cached in a disaster-proof storage unit. A second instance of each received data object is sent for storage in a secondary storage device.

A list of identifiers of the data objects that are cached in the disaster-proof storage unit at a given point in time is sent from the disaster-proof storage unit to the secondary storage device. Following an event that renders at least some of the data objects on the primary storage device inaccessible, a request sent to the secondary storage device to access a given data object is received. A selection is made, responsively to the list, to serve the cached first instance or the stored second instance of the given data object in response to the request.

35 Claims, 3 Drawing Sheets

U.S. PATENT DOCUMENTS

| | | | |
|---|---|---|---|
| 6,173,377 B1* | 1/2001 | Yanai et al. | 711/162 |
| 6,226,651 B1 | 5/2001 | Masuda et al. | |
| 6,260,125 B1 | 7/2001 | McDowell et al. | |
| 6,324,654 B1 | 11/2001 | Wahl et al. | |
| 6,389,552 B1 | 5/2002 | Hamilton et al. | |
| 6,654,862 B2* | 11/2003 | Morris | 711/162 |
| 6,658,590 B1 | 12/2003 | Sicola et al. | |
| 6,842,825 B2 | 1/2005 | Geiner et al. | |
| 6,859,865 B2 | 2/2005 | De Margerie et al. | |
| 6,954,875 B2 | 10/2005 | Liu | |
| 6,976,140 B2* | 12/2005 | Satoyama et al. | 711/161 |
| 6,976,186 B1 | 12/2005 | Gardner | |
| 7,020,743 B2* | 3/2006 | Lee et al. | 711/113 |
| 7,111,189 B1 | 9/2006 | Sicola et al. | |
| 7,148,802 B2 | 12/2006 | Abbroscato et al. | |
| 7,185,228 B2 | 2/2007 | Achiwa | |
| 7,188,292 B2 | 3/2007 | Cordina et al. | |
| 7,383,405 B2 | 6/2008 | Vega et al. | |
| 7,386,610 B1* | 6/2008 | Vekiarides | 709/224 |
| 7,451,355 B1 | 11/2008 | Coatney et al. | |
| 7,478,266 B2 | 1/2009 | Gatto et al. | |
| 7,487,311 B2 | 2/2009 | Stroberger et al. | |
| 7,707,453 B2* | 4/2010 | Winokur | 714/6 |
| 7,707,460 B2 | 4/2010 | Hyde, II et al. | |
| 7,797,582 B1 | 9/2010 | Stager et al. | |
| 2001/0047412 A1* | 11/2001 | Weinman, Jr. | 709/225 |
| 2002/0162112 A1 | 10/2002 | Javed | |
| 2003/0014523 A1 | 1/2003 | Teloh et al. | |
| 2003/0079156 A1* | 4/2003 | Sicola et al. | 714/4 |
| 2003/0097607 A1* | 5/2003 | Bessire | 714/5 |
| 2003/0158869 A1* | 8/2003 | Micka | 707/203 |
| 2003/0204597 A1 | 10/2003 | Arakawa et al. | |
| 2003/0221074 A1* | 11/2003 | Satoyama et al. | 711/162 |
| 2004/0012316 A1* | 1/2004 | Davis | 312/409 |
| 2004/0030837 A1 | 2/2004 | Geiner et al. | |
| 2004/0044649 A1 | 3/2004 | Yamato et al. | |
| 2004/0044865 A1* | 3/2004 | Sicola et al. | 711/162 |
| 2004/0059844 A1 | 3/2004 | Jones et al. | |
| 2004/0064639 A1* | 4/2004 | Sicola et al. | 711/114 |
| 2004/0073831 A1* | 4/2004 | Yanai et al. | 714/7 |
| 2004/0107315 A1* | 6/2004 | Watanabe et al. | 711/114 |
| 2004/0153717 A1* | 8/2004 | Duncan | 714/5 |
| 2004/0193802 A1* | 9/2004 | Meiri et al. | 711/118 |
| 2004/0230352 A1* | 11/2004 | Monroe | 701/3 |
| 2005/0005001 A1 | 1/2005 | Hara et al. | |
| 2005/0015657 A1* | 1/2005 | Sugiura et al. | 714/6 |
| 2005/0027892 A1* | 2/2005 | McCabe et al. | 709/253 |
| 2005/0066128 A1* | 3/2005 | Yagisawa et al. | 711/114 |
| 2005/0243609 A1 | 11/2005 | Yang et al. | |
| 2005/0280421 A1 | 12/2005 | Yomoda et al. | |
| 2006/0025897 A1 | 2/2006 | Shostak et al. | |
| 2006/0031468 A1* | 2/2006 | Atluri et al. | 709/224 |
| 2006/0075148 A1* | 4/2006 | Osaki | 710/5 |
| 2006/0095700 A1* | 5/2006 | Sato et al. | 711/165 |
| 2006/0101214 A1* | 5/2006 | Mikami | 711/162 |
| 2006/0117157 A1* | 6/2006 | Kitamura | 711/163 |
| 2006/0129608 A1* | 6/2006 | Sato et al. | 707/200 |
| 2006/0136633 A1* | 6/2006 | Harima et al. | 710/104 |
| 2006/0150001 A1* | 7/2006 | Eguchi et al. | 714/6 |
| 2006/0212667 A1* | 9/2006 | Mikami | 711/162 |
| 2007/0079088 A1 | 4/2007 | Deguchi et al. | |
| 2007/0094467 A1 | 4/2007 | Yamasaki | |
| 2007/0124789 A1 | 5/2007 | Sachson et al. | |
| 2007/0198613 A1 | 8/2007 | Prahlad et al. | |
| 2007/0266197 A1 | 11/2007 | Neyama et al. | |
| 2008/0001128 A1 | 1/2008 | Goldberg | |
| 2008/0004904 A1 | 1/2008 | Tran | |
| 2008/0061963 A1 | 3/2008 | Schnitz et al. | |
| 2008/0104443 A1 | 5/2008 | Akutsu et al. | |
| 2008/0177964 A1 | 7/2008 | Takahashi et al. | |
| 2008/0201390 A1 | 8/2008 | Anguelov | |
| 2008/0263363 A1 | 10/2008 | Jueneman et al. | |
| 2008/0297346 A1 | 12/2008 | Brackmann et al. | |
| 2009/0007192 A1 | 1/2009 | Singh | |
| 2009/0216969 A1 | 8/2009 | Winokur | |
| 2010/0169706 A1* | 7/2010 | Winokur | 714/6 |

FOREIGN PATENT DOCUMENTS

| | | |
|---|---|---|
| EP | 0420425 A2 | 4/1991 |
| EP | 1559449 | 5/2008 |
| RU | 2128854 C1 | 4/1999 |
| RU | 2221177 C2 | 1/2004 |
| WO | 01/97030 A1 | 12/2001 |
| WO | WO 2006/111958 | 10/2006 |
| WO | WO 2008/049703 | 5/2008 |

OTHER PUBLICATIONS

EMC Corporation, "EMC SRDF Family: High-Performance remote replication for business continuity", USA (Sep. 6, 2006).

IBM Corporation, "Storage Solutions: Data Encryption within the Drive Itself", USA (Sep. 6, 2006).

U.S. Appl. No. 10/585,587 Official Action dated Aug. 20, 2009.

European Patent Application No. 06728254.1 Supplementary Search Report dated Aug. 19, 2009.

"Flexible Min-K: Product Information", Thermal Ceramics Inc, Jan. 2008.

U.S. Appl. No. 10/585,587 Official Action dated Dec. 7, 2009.

Chinese Patent Application No. 200680017546.1 Official Action dated Dec. 26, 2008.

EMC Corporation, "EMC SRDF Family", Hopkinton, Massachusetts (Sep. 6, 2006), http://www.emc.com/products/family/srdf-family.htm.

FireTrust, "FireTrust technology", Brussels, Belgium, 2008, http://www.firetrust.eu/en/index.html.

Goldfire LTD., "Technology and Solutions Developed for Our Clients", Brussels, Belgium, 2008, http://www.goldfire.be/en/index.html.

IBM Corporation, "Storage Solutions", Armonk, NY, USA (Sep. 6, 2006), http://www-03.ibm.com/systems/storage/solutions/.

International Application No. PCT/IL2006/000453 Search Report dated Mar. 9, 2007.

International Application No. PCT/IL2008/001052 Search Report dated Nov. 19, 2008.

International Application PCT/IL2006/000453 International Preliminary Report on Patentability dated Nov. 1, 2007.

European Patent Application No. 06728254.1 Official Action dated Jan. 22, 2010.

European Patent Application No. 06728254.1 Official Action dated Sep. 3, 2009.

International Application PCT/IB2009/051919 Search Report dated Oct. 16, 2009.

International Application PCT/IB2010/050041 Search Report dated Jun. 8, 2010.

International Application PCT/IB2009/055961 Search Report dated Jun. 24, 2010.

Russian Patent Application # 2009126283 Official Action dated Sep. 7, 2010.

U.S. Appl. No. 12/721,580 Official Action dated Sep. 28, 2010.

ANSI/INCITS standard 269-1996, "Information Technology—SCSI-3 Fibre Channel Protocol (FCP)", American National Standards Institute (ANSI) and the International Committee for Information Technology Standards (INCITS), Apr. 8, 1996.

International Application PCT/IB2010/053427 Search Report dated Dec. 27, 2010.

U.S. Appl. No. 12/721,580 Official Action dated Feb. 23, 2011.

Russian Patent Application No. 2009126283 Official Action dated Mar. 1, 2011.

U.S. Appl. No. 12/463,438 Official Action dated Mar. 4, 2011.

EP Application # 11150100.3 Partial Search Report dated Mar. 1, 2011.

Nadporojski, G., "Review of GSM-telephone Benefon Twin+", published on http://www.ixbt.com, Jan. 9, 2001.

* cited by examiner

FAST DATA RECOVERY SYSTEM

CROSS-REFERENCE TO RELATED APPLICATIONS

This application claims the benefit of U.S. Provisional Patent Application 60/978,278, filed Oct. 8, 2007, whose disclosure is incorporated herein by reference.

FIELD OF THE INVENTION

The present invention relates generally to data protection systems, and particularly to methods and systems for recovering data following disaster events.

BACKGROUND OF THE INVENTION

Various methods and systems are known in the art for protecting data in computer systems against disasters such as earthquakes, storms, floods, fires and terrorist attacks. Some solutions involve replicating (mirroring) the data in a primary and a secondary storage device. For example, EMC Corporation (Hopkinton, Mass.) offers a family of remote storage replication solutions called Symmetrix Remote Data Facility (SRDF) for disaster recovery and business continuity. The SRDF product family includes both synchronous and asynchronous solutions. As another example, IBM Corporation (Armonk, N.Y.) offers a number of business continuity solutions, including mirroring products.

PCT International Publication WO 2006/111958, whose disclosure is incorporated herein by reference, describes a method for data protection, which includes accepting data for storage from one or more data sources. The data is sent for storage in a primary storage device and in a secondary storage device. While awaiting an indication of successful storage of the data in the secondary storage device, a record associated with the data is temporarily stored in a disaster-proof storage unit adjacent to the primary storage device. When an event damaging at least some of the data in the primary storage device occurs, the data is reconstructed using the record stored in the disaster-proof storage unit and at least part of the data stored in the secondary storage device.

SUMMARY OF THE INVENTION

Embodiments of the present invention provide a data processing method, including:

receiving data objects from a data source for storage by a primary storage device;

caching a respective first instance of each of at least some of the received data objects in a disaster-proof storage unit, and sending a respective second instance of each received data object for storage in a secondary storage device;

sending from the disaster-proof storage unit to the secondary storage device a list of respective identifiers of the data objects that are cached in the disaster-proof storage unit at a given point in time;

following an event that renders at least some of the data objects on the primary storage device inaccessible at the given point in time, receiving a request sent to the secondary storage device to access a given data object; and choosing, at the secondary storage device, responsively to the list, to serve either the cached first instance or the stored second instance of the given data object in response to the request.

In some embodiments, sending the list includes transmitting the list to the secondary storage device over a wireless link. In an embodiment, choosing to serve the first or second instance includes serving the second instance responsively to verifying that the given data object does not appear in the list. Choosing to serve the first or second instance may include serving the second instance responsively to verifying that the given data object appears in the list and that the request specifies storage of the given data object.

Additionally or alternatively, choosing to serve the first or second instance includes serving the first instance cached in the disaster-proof storage unit responsively to verifying that the given data object appears in the list and that the request specifies retrieval of the given data object. Serving the first instance may include requesting the disaster-proof storage unit to send the cached first instance to the secondary storage device with high priority. In a disclosed embodiment, the disaster-proof storage unit stores multiple first instances of the given object having respective creation times, and serving the first instance includes serving the first instance whose creation time is most recent among the multiple first instances.

In yet another embodiment, when the request specifies storage of the given data object, choosing to serve the first or second instance includes storing the given data object in the secondary storage device before fully receiving the list, temporarily recording an identifier of the given data object, and, upon fully receiving the list, deleting the identifier from the list. In still another embodiment, the cached first instances are sent to the secondary storage device after sending the list. In an embodiment, choosing to serve the first or second instance is performed before all the cached first instances are received at the secondary storage device.

In some embodiments, the method includes deleting all the identifiers pertaining to a certain data object from the list responsively to receiving the respective first instance of the certain data object from the disaster-proof storage unit. Additionally or alternatively, the given data object is deleted from the list after serving the chosen instance.

In an embodiment, the method includes configuring an unconditional setting to serve the stored second instance responsively to verifying that the list is empty. Configuring the unconditional setting may include configuring a network switch to permanently forward requests to the secondary storage device. In a disclosed embodiment, sending the list includes producing the list responsively to the event. Additionally or alternatively, sending the list includes updating the list before the event responsively to caching additional first instances.

There is also provided, in accordance with an embodiment of the present invention, apparatus for data processing, including:

a mirroring processor, which is configured to receive data objects from a data source, to send respective first instances of the received data objects for storage in a primary storage device and to send respective second instances of the received data objects for storage in a secondary storage device;

a disaster-proof storage unit, which is coupled to cache the respective first instance of each of at least some of the received data objects and to send to the secondary storage device a list of respective identifiers of the data objects that are cached in the disaster-proof storage unit at a given point in time; and a recovery processor, which is configured, following an event that renders at least some of the data objects on the primary storage device inaccessible at the given point in time, to receive a request sent to the secondary storage device to access a given data object and to choose, responsively to the list, to serve either the cached first instance or the stored second instance of the given data object in response to the request.

There is additionally provided, in accordance with an embodiment of the present invention, apparatus for data processing, including:

a mirroring processor, which is configured to receive data objects from a data source, to send respective first instances of the received data objects for storage in a primary storage device and to send respective second instances of the received data objects for storage in a secondary storage device;

a disaster-proof storage unit, which is coupled to cache the respective first instance of each of at least some of the received data objects and to transmit a list of respective identifiers of the data objects that are cached in the disaster-proof storage unit at a given point in time; and a recovery processor, which is configured, following an event that renders at least some of the data objects on the primary storage device inaccessible at the given point in time, to receive the list from the disaster-proof storage unit and to forward the list to the secondary storage device, so as to enable the secondary storage device to choose, responsively to the list, to respond to a request to access a given data object by serving either the cached first instance or the stored second instance of the given data object.

There is further provided, in accordance with an embodiment of the present invention, a system, including:

a data source;

a primary storage device;

a secondary storage device;

a mirroring processor, which is configured to receive data objects from the data source, to send respective first instances of the received data objects for storage in the primary storage device and to send respective second instances of the received data objects for storage in the secondary storage device;

a disaster-proof storage unit, which is coupled to cache the respective first instance of each of at least some of the received data objects and to send to the secondary storage device a list of respective identifiers of the data objects that are cached in the disaster-proof storage unit at a given point in time; and a recovery processor, which is configured, following an event that renders at least some of the data objects on the primary storage device inaccessible at the given point in time, to receive a request sent to the secondary storage device to access a given data object and to choose, responsively to the list, to serve either the cached first instance or the stored second instance of the given data object in response to the request.

There is additionally provided, in accordance with an embodiment of the present invention, a computer software product for data processing, for use in a system that receives data objects from a data source, sends respective first instances of the data objects for storage in a primary storage device and respective second instances of the data objects for storage in a secondary storage device and includes a disaster-proof storage unit, which caches the respective first instance of each of at least some of the received data objects and sends to the secondary storage device a list of respective identifiers of the data objects that are cached in the disaster-proof storage unit at a given point in time, the product including a tangible computer-readable medium, in which program instructions are stored, which instructions, when read by a computer, cause the computer, following an event that renders at least some of the data objects on the primary storage device inaccessible at the given point in time, to receive a request sent to the secondary storage device to access a given data object and to choose, responsively to the list, to serve either the cached first instance or the stored second instance of the given data object in response to the request.

The present invention will be more fully understood from the following detailed description of the embodiments thereof, taken together with the drawings in which:

DETAILED DESCRIPTION OF EMBODIMENTS

Overview

Figure 1:
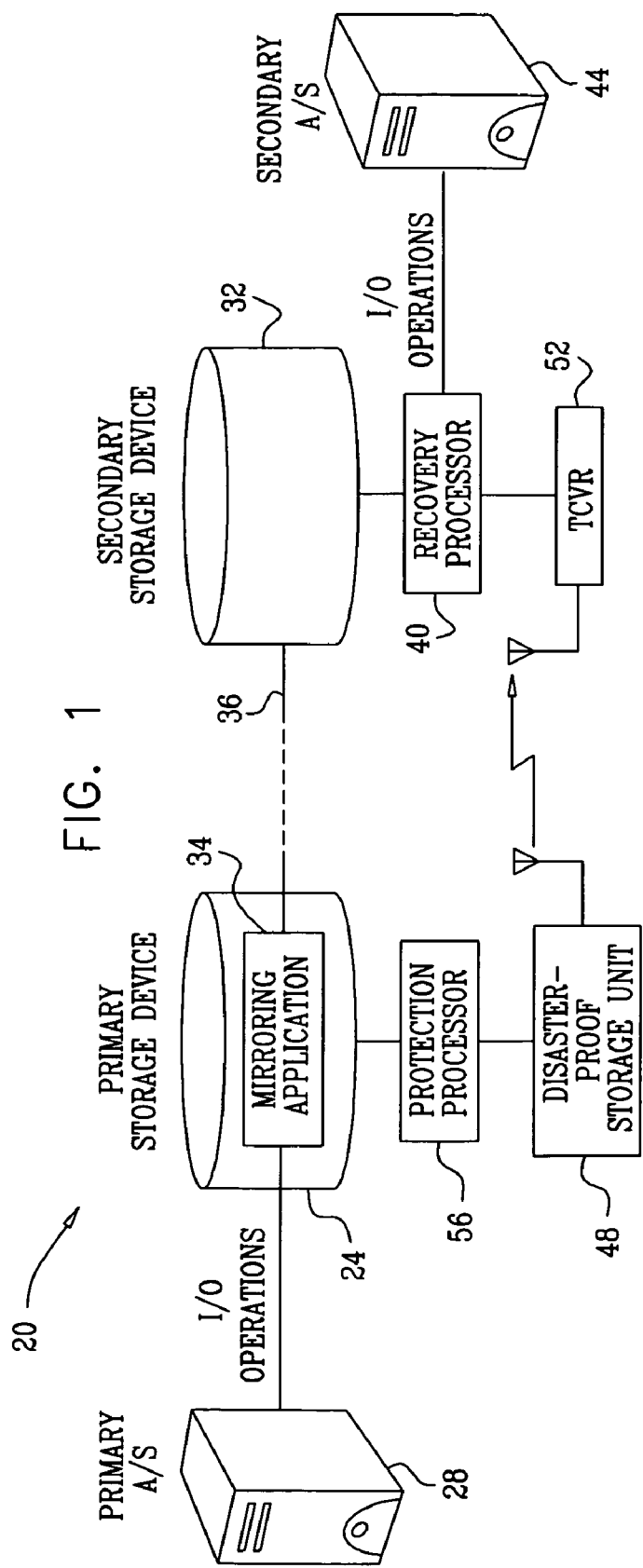
FIG. 1 is a block diagram that schematically illustrates a system for data protection, in accordance with an embodiment of the present invention.

Many known data protection schemes store mirrored (replicated) instances of data in a primary storage device and in a secondary storage device. The secondary storage device is typically located at a remote site, in order to isolate it from disaster events that may hit the primary storage device. Transferring the data to the remote site, however, inevitably introduces some delay into the data storage process. Because of this delay, a certain amount of data is unprotected, i.e., not yet successfully stored in the secondary storage device, at any given time. When a disaster event hits the primary storage device, the unprotected data may be lost.

Some known protection schemes cache the unprotected data temporarily in a disaster-proof storage unit that is adjacent to the primary storage device. Following a disaster event, the cached data is transmitted from the disaster-proof storage unit to the remote site. The entire body of data can then be reconstructed using the data stored in the secondary storage device and the cached data received from the disaster-proof storage unit. The disaster-proof unit typically transmits the cached data over a wireless link, such as a cellular connection.

In such protection schemes, the recovery time (i.e., the time until normal system operation can be resumed following a disaster event) depends on the amount of cached data and on the throughput of the wireless link that connects the disaster-proof unit with the secondary site. In many practical cases, transmitting the cached data over the wireless link requires an unacceptably long time, often on the order of several hours.

Embodiments of the present invention provide improved methods and systems for data protection and recovery, which considerably reduce the recovery time following a disaster event. In some embodiments that are described hereinbelow, a primary application server (or other data source) at the primary site runs certain applications, which issue Input/Output (I/O) commands. Each I/O command requests access to a certain data object, i.e., specifies a certain data object that is to be stored or retrieved. When storing data objects, instances of the objects are sent for storage in a primary storage device and in a secondary storage device. A subset of the data objects is temporarily cached in a disaster-proof storage unit, typically until they are successfully backed-up in the secondary storage device.

The disaster-proof unit maintains a list of the data objects cached therein. This list is referred to herein as a metadata list. When data recovery is initiated after a disaster event, the disaster-proof storage unit transmits the metadata list and cached objects over a wireless link to a recovery processor at the secondary site. The metadata list is transmitted first, followed by the cached data objects.

Following a disaster, a secondary application server at the secondary site runs applications similarly to the primary application server. The recovery processor begins to serve the I/O commands issued by the secondary application server as soon as the metadata list is received. The recovery processor determines how each I/O command is to be served based on the type of command and on the metadata list. For example, I/O commands specifying data objects that do not appear in the metadata list can be served immediately using the data stored in the secondary storage device. WRITE commands are also served immediately using the secondary storage device, even if they specify objects that appear in the metadata list.

A READ command specifying an object that appears in the metadata list is redirected and served from the disaster-proof storage unit (e.g., by requesting the disaster-proof unit to transmit the object to the secondary site with high priority). Data objects are deleted from the metadata list when they are successfully received at the secondary site, or following a WRITE command. When the metadata list becomes empty, data recovery can be carried out exclusively using the secondary storage device.

When using the methods and systems described herein, the applications running on the secondary application server resume normal operation as soon as the metadata list is received at the secondary site, rather than waiting for the entire bulk of cached data objects. Most I/O commands are served without involving the disaster-proof unit or waiting for the cached data objects to be received. Only a small fraction of the I/O commands are redirected to the disaster-proof storage unit. Thus, in comparison with known methods, the recovery time is reduced dramatically, e.g., from several hours to several minutes.

System Description

FIG. 1 is a block diagram that schematically illustrates a system 20 for data protection, in accordance with an embodiment of the present invention. System 20 protects data of an organization against disasters, and enables fast data recovery following a disaster event. Disaster events may comprise any event that affects the organization, and in particular the data storage of the organization, such as an earthquake, a storm, a fire, a flood or a terrorist attack. In some cases, a system failure, such as a computer system failure or a power outage that affects the data storage of the organization, can also be regarded as a disaster event. Generally speaking, a disaster event may comprise any event that renders at least some of the data in the primary storage device inaccessible at a certain point in time.

In order to protect the data, system 20 mirrors (i.e., replicates) the data and stores it in two or more storage devices. In the embodiment of FIG. 1, system 20 comprises a primary storage device 24 and a secondary storage device 32. The two storage devices hold replicas of the organization data, in a configuration that is commonly known as a mirrored configuration. Storage devices 24 and 32 may comprise disks, magnetic tapes, computer memory devices, and/or devices based on any other suitable storage technology. In some embodiments, the storage devices comprise internal processors that perform local data storage and retrieval-related functions. Although the description that follows refers to two storage devices, other implementations of system 20 may comprise a higher number of storage devices.

Typically, the primary and secondary storage devices are physically located at two separate sites. The sites are chosen to be sufficiently distant from one another, so that a disaster event in one of the sites will be unlikely to affect the other.

System 20 stores data that is produced and/or used by one or more data sources. In the present example, the data is produced by an Application Server (AS) 28 of an Information Technology (IT) system of the organization. AS 28 is referred to as a primary AS. The applications that run on the application server are sometimes referred to as production applications. Additionally or alternatively, however, system 20 may store data that is produced by any other suitable data source, such as a Private Automatic Branch Exchange (PABX) or telephony switch, a surveillance system of the organization such as a closed-circuit television (CCTV) system, an access control system, and/or any other system that produces data.

When the primary site is functional, the data produced by the primary AS is stored in primary storage device 24, and is mirrored in parallel to secondary storage device 32. In the example of FIG. 1, the primary storage device is collocated with the primary AS at a local site, and the secondary storage device is located at a remote site.

A mirroring application 34 performs mirroring of the data, i.e., stores replicas of the data produced by primary AS 28 in the primary and the secondary storage devices. Typically, the mirroring application accepts from the primary AS Input/Output (I/O) commands, which request to access respective data objects, i.e., specify data objects to be stored or retrieved. When data is to be stored, the mirroring application stores the data in the primary storage device, and sends the data over a communication link 36 for storage in the secondary storage device. In the exemplary embodiment of FIG. 1, the mirroring application runs on the CPU of the primary storage device. Alternatively, application 34 may run on a separate processor. In either case, the processor running the mirroring application is referred to as a mirroring processor.

The mirroring and remote storage operations inevitably involve a certain time delay. The delay is caused, for example, by the mirroring application, by the physical separation between the primary and secondary sites, and by the communication protocols used over link 36. Because of this delay, at any point in time, a certain amount of unprotected data may still be in transit, i.e., it may not yet be successfully stored in the secondary storage device. When a disaster hits the primary site, such unprotected data may be lost.

In order to protect the data until it is successfully stored in the secondary storage device, system 20 comprises a disaster-proof storage unit 48, which is controlled by a protection processor 56. Processor 56 temporarily caches the mirrored data in the disaster-proof unit, until the secondary site acknowledges that the data has been successfully stored in the secondary storage device. The disaster-proof storage unit is assumed to be sufficiently durable to survive disaster events. Thus, following a disaster, the entire organization data can be reconstructed based on the data that is backed-up in the secondary site and the data that is cached in the disaster-proof unit.

In some embodiments, when data recovery is performed, the disaster-proof storage unit transmits the cached data over a wireless (or partially-wireless) link to the secondary site, where the cached data is combined with the data that is stored in the secondary storage device. In the configuration of FIG. 1, the disaster-proof storage unit transmits the stored data to a wireless transceiver (TCVR) 52, which is connected directly or indirectly to a recovery processor 40, both located at the secondary site. The recovery processor, which is also connected to the secondary storage device, carries out the data recovery processes described herein. Some aspects of data backup and recovery using disaster-proof storage units, as well as alternative system configurations that use such units, are described in PCT International Publication WO 2006/111958, cited above.

The wireless link connecting unit 48 to the secondary site may comprise any suitable wireless link, such as a cellular connection. TCVR 52 is regarded as an interface, using which the recovery processor communicates with the disaster-proof storage unit. In alternative embodiments, unit 48 may be connected to the secondary site via a wired link, such as a telephone connection, or using any other suitable link that is likely to survive disaster events, using a suitable interface. In a typical implementation, unit 48 communicates over a cellular link to a nearby cellular base station, which is connected to the recovery processor via the cellular network and possibly also via a wired telephone network.

System 20 further comprises a secondary AS 44, which serves as a backup to primary AS 28. Following a disaster event, the secondary AS may run the applications of the organization similarly to the primary AS, so that the organization IT system may continue to function using the recovered data. Similarly to the primary AS, the secondary AS issues I/O commands that specify data objects to be stored or retrieved. These commands are processed by the recovery processor and served using the secondary storage device and the disaster-proof storage unit, using methods that are described in detail hereinbelow.

Figure 2:
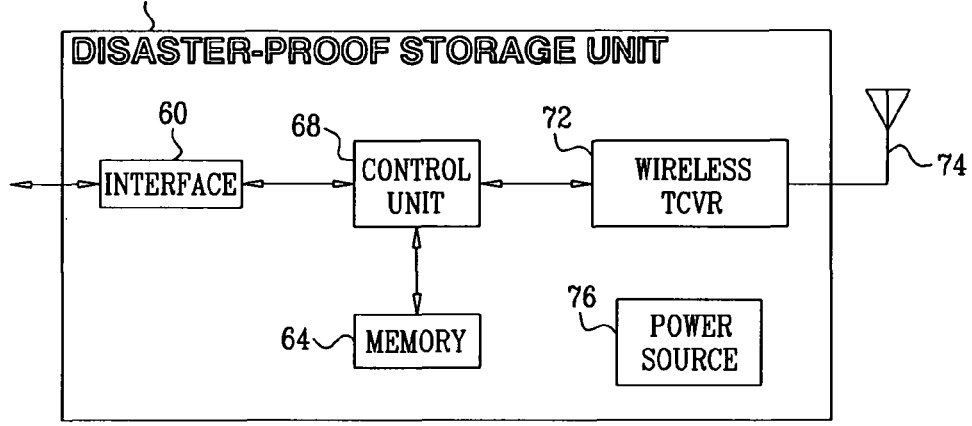
FIG. 2 is a block diagram that schematically illustrates a disaster-proof storage unit, in accordance with an embodiment of the present invention.

FIG. 2 is a block diagram that schematically illustrates disaster-proof storage unit 48, in accordance with an embodiment of the present invention. Unit 48 comprises an interface 60 for communicating with protection processor 56, a control unit 68 for controlling and managing the operation of unit 48, a wireless transceiver (TCVR) 72 and an antenna 74 for communicating over the wireless link with TCVR 52, a memory 64 for caching the data provided to unit 48 by protection processor 56, and a power source 76 for providing electrical power to unit 48. Control unit 68 may comprise an auxiliary memory (not shown in the figure), which stores the program code of unit 48.

In some embodiments, protection processor 56, recovery processor 40 and control unit 68 comprise general-purpose processors, which are programmed in software to carry out the functions described herein. The software may be downloaded to the processors in electronic form, over a network, for example, or it may, alternatively or additionally, be provided and/or stored on tangible media, such as magnetic, optical, or electronic memory.

Fast Data Recovery

In many applications, it is important that the data stored in the primary storage device is recovered following a disaster event within a short period of time. On the other hand, the speed of data recovery is often limited by the throughput of the wireless communication link that is used for transmitting the cached data from disaster-proof storage unit 48 to the secondary site (to TCVR 52).

For example, in a system having a storage I/O rate of 200 MBps, five seconds of storing write operations will generate 1 GB of data. A conventional cellular wireless link having a throughput of 384 Kbps will need approximately six hours to transmit these write operations to the secondary site. Assuming that data recovery can be initiated only when all cached data is transferred to the secondary site, normal operation of the system may resume no less than six hours after the recovery process was initiated. In many applications, such time delays may be prohibitive.

Embodiments of the present invention provide improved methods and systems for data protection and recovery, which reduce the recovery time dramatically. In some embodiments, the disaster-proof storage unit maintains a list of the data objects cached therein. This list is referred to herein as a metadata list. When data recovery is initiated, the disaster-proof storage unit first transmits the metadata list to the secondary site, followed by the cached data objects. The recovery processor may begin processing I/O commands from the secondary AS as soon as the metadata list is received, rather than waiting for the data objects themselves.

The recovery processor uses the metadata list to determine how each I/O command is to be served, and acts accordingly. For example, I/O commands related to data objects that do not appear in the metadata list can be served immediately using the data stored in the secondary storage device. (The absence of a given data object from the metadata list indicates that an up-to-date version of this object is successfully backed-up in the secondary storage device.) Even if a data object specified in a I/O command does appear in the metadata list (meaning the object cannot be assumed to be backed-up in the secondary storage device), the command can still be served from the secondary storage device if it is a WRITE command. When a READ command specifies an object that appears in the metadata list, the recovery processor initiates a request for transmitting this data object from the disaster-proof storage unit with high priority.

Whenever a certain data object is transferred successfully from the disaster-proof storage unit to the secondary storage device, the object is deleted from the metadata list. As a result, subsequent I/O commands specifying this object will be served from the secondary storage device. A data object is also deleted from the metadata list in response to serving a WRITE command, since in this case too, the version of the data object that is stored in the secondary storage device is up-to-date. When the metadata list becomes empty, data recovery can be carried out exclusively using the secondary storage device.

As can be appreciated, the process described above reduces data recovery time dramatically. The delay reduction is especially significant when using a relatively low-bandwidth wireless link, or when the data storage throughput of the system is especially high. When using the methods described herein, the secondary AS can resume normal operation as soon as the metadata list is received at the secondary site, rather than waiting for the entire bulk of cached data objects. Most of the I/O commands issued by the secondary AS can be served immediately from the secondary site. Only a small subset of the I/O commands (READ commands specifying data objects that appear in the metadata list) will experience some delay, since they have to be retrieved from the disaster-proof storage unit.

The term "data object" is used herein to describe a basic unit of information that is stored or retrieved by the applications running on the primary and secondary application servers. Typically, each data object is assigned a unique identifier (ID) that identifies it in system 20. Each data object that is stored in unit 48 also has a respective creation time, which indicates the time in which the object was stored in the disaster-proof storage unit. The term "mirror object" refers to a data object, which mirrors (replicates) a certain data object stored at the primary site. Mirror objects are generated by the mirroring application.

The ID assigned to each data object may comprise, for example, a character string that uniquely identifies the data object. In some embodiments, the object ID comprises a storage address (or other location identifier) of the data object in the primary storage device. There exists a predefined one-to-one mapping between the IDs of the data objects and the IDs of the corresponding mirror objects. In some cases, the term "object ID" is used herein interchangeably to refer to the ID of a data object or to the ID of the corresponding mirror object.

The metadata list comprises a list of object IDs, typically ordered by the object creation times. The metadata list may comprise multiple instances of a certain object ID having different creation times. In some embodiments, unit 48 updates the metadata list when data objects are being cached. Alternatively, unit 48 may produce the metadata list (e.g., by scanning the cached data objects) when data recovery is initiated.

Figure 3:
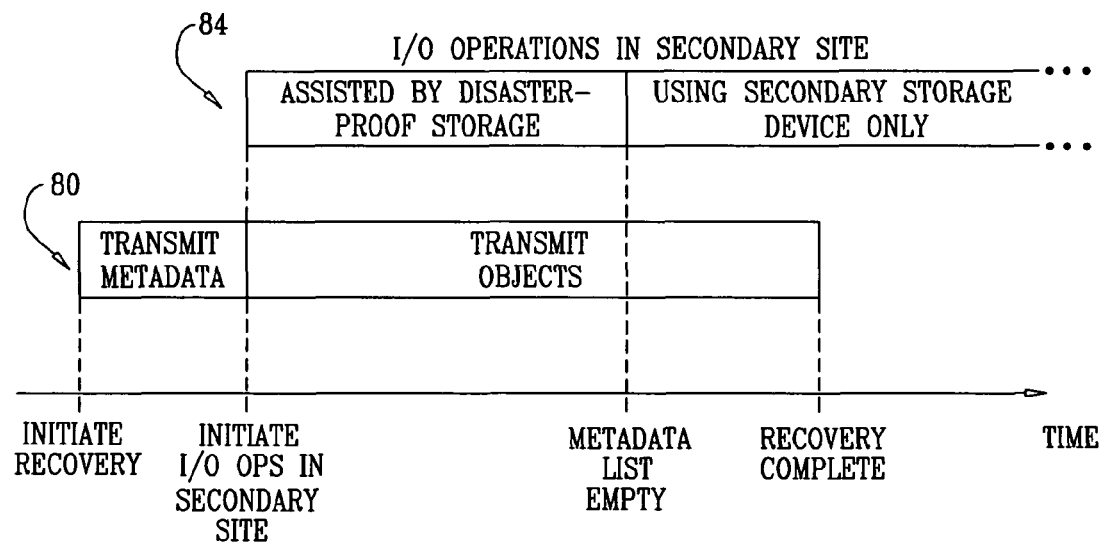
FIG. 3 is a timing diagram that schematically illustrates a process of recovering data following a disaster event, in accordance with an embodiment of the present invention.

FIG. 3 is a timing diagram that schematically illustrates the recovery process described above, in accordance with an embodiment of the present invention. The figure shows a time line 80, which illustrates the actions taken by the disaster-proof storage unit, and a time line 84, which illustrates the I/O operations performed at the secondary site.

As can be seen in the figure, when data recovery is initiated following a disaster, the disaster-proof storage unit begins transmitting the metadata list to the secondary site, followed by the data objects themselves. As soon as the metadata list is received, the secondary AS may begin performing I/O commands. Initially, the serving of I/O commands is assisted by the disaster-proof storage unit, meaning that some of the I/O commands use objects that need to be retrieved from the disaster-proof unit. As I/O commands continue, objects are gradually deleted from the metadata list, until the list becomes empty at some stage. When the metadata list becomes empty, I/O commands may be served exclusively by the secondary storage device, even though data objects are still transmitted from the disaster-proof storage unit.

Figure 4:
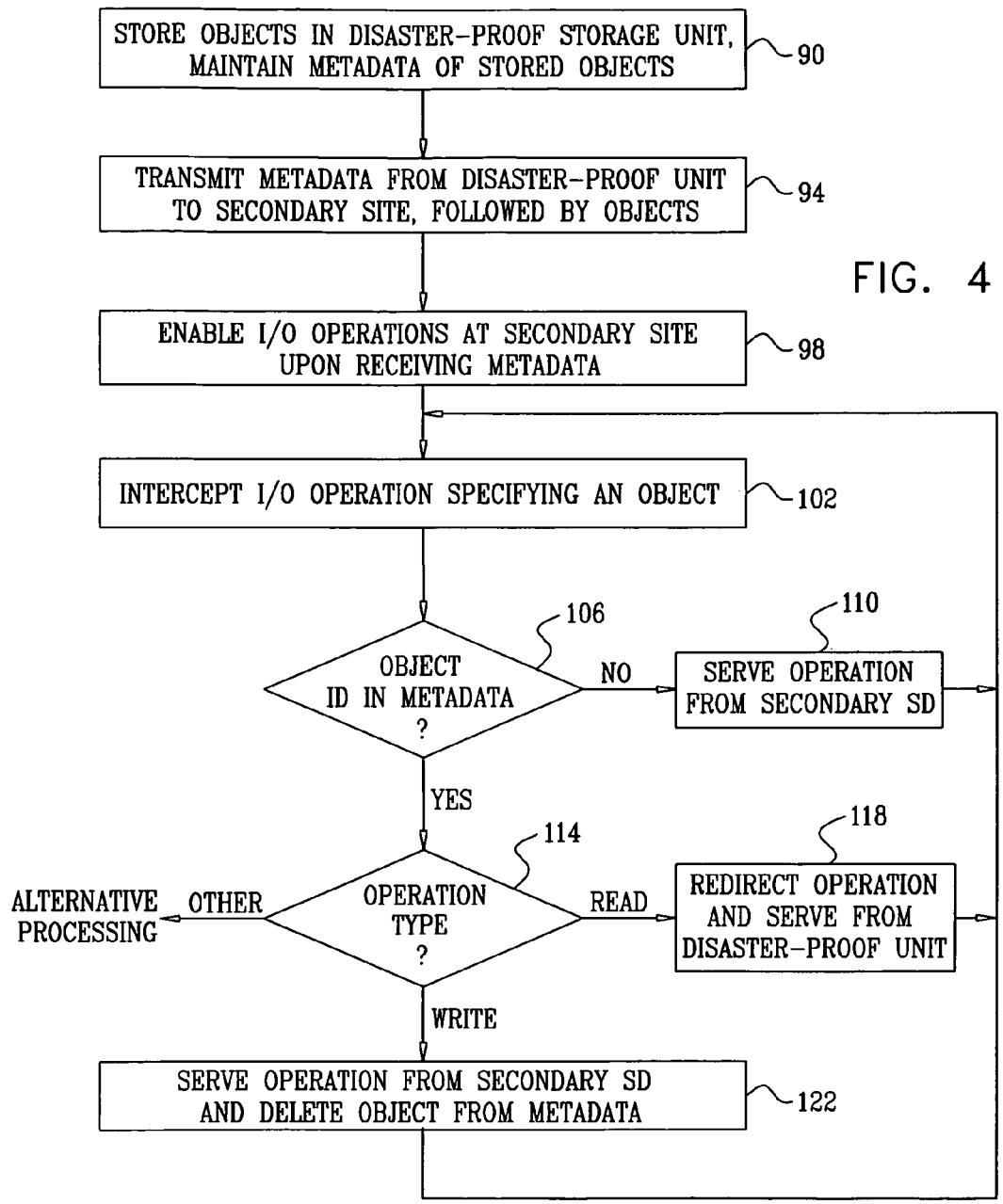
FIG. 4 is a flow chart that schematically illustrates a method of recovering data following a disaster event, in accordance with an embodiment of the present invention.

FIG. 4 is a flow chart that schematically illustrates a method of recovering data following a disaster event, in accordance with an embodiment of the present invention. The method begins with system 20 caching data in disaster-proof unit 48, at a caching step 90. Step 90 addresses the normal operation of the system, in which data is temporarily cached in unit 48, until the data is safely mirrored in the secondary storage device.

In response to a disaster event that hits the primary site, the disaster-proof storage unit transmits the cached metadata list and data objects to the secondary site, at a cache transmission step 94. The disaster-proof storage unit transmits the metadata list and objects to TCVR 52, which forwards the data to recovery processor 40. The metadata list is transmitted first, followed by the data objects. Typically, the data objects are transmitted in order of their creation times. Each data object that is received at the secondary site is stored in the secondary storage device, and its object ID is deleted from the metadata list.

Upon receiving the metadata list, the recovery processor enables serving I/O commands (operations) by the secondary AS, at an enabling step 98. From this stage, the recovery processor intercepts I/O commands issued by the secondary AS and serves them in different ways, depending on the metadata list and on the type of command.

The recovery processor intercepts an I/O command issued by secondary AS 44, at a command interception step 102. The intercepted command requests to access a certain data object, i.e., specifies a certain data object that is to be stored in or retrieved from the secondary storage device. The recovery processor intercepts the command before the command reaches the secondary storage device.

The recovery processor checks whether the object ID of the data object specified in the command appears in the metadata list, at a list checking step 106. If the object ID of the specified data object does not appear in the metadata list, the recovery processor concludes that an up-to-date version of this object is successfully mirrored in the secondary storage device. Thus, the recovery processor serves the I/O command from the secondary storage device, at a command serving step 110. The method then loops back to step 102 above, for intercepting and processing the next I/O command.

Otherwise, i.e., if the object ID of the specified data object appears in the metadata list, the recovery processor checks whether the I/O command comprises a READ command, a WRITE command or another command, at an command type checking step 114. Some storage protocols comprise commands that are neither READ nor WRITE commands. Handling of such commands is outside the scope of this patent application.

If the I/O command comprises a read command, the recovery processor redirects the READ command to the disaster-proof storage unit, at a redirection step 118. The READ command is thus served from the disaster-proof storage unit. Redirection of the READ command to the disaster-proof storage unit may be performed in various ways. In some embodiments, the recovery processor sends a request to the disaster-proof unit to transmit the data object in question with high priority. In response to the request, the disaster-proof storage unit transmits the most recent version of the data object as soon as possible, so that it will be received by TCVR 52 and forwarded to the recovery processor with minimal latency. The recovery processor then serves the READ command using the data object that was received from the disaster-proof unit. The method loops back to step 102 above. In this case, when the READ command is served, all instances of the data object are erased.

If, on the other hand, the I/O command is a write command, the recovery processor serves the WRITE command from the secondary storage device, at a serving and erasing step 122. The recovery processor then erases all instances of the ID of the written data object from the metadata list. In some embodiments, the disaster-proof unit refrains from transmitting this data object over the wireless link. The method loops back to step 102 above, and the recovery processor intercepts and processes the next I/O command.

Command interception step 102 can be implemented in different ways, depending upon system configuration. In some embodiments, recovery processor 40 is connected between secondary AS 44 and secondary storage device 32. In this configuration, all I/O commands issued by the secondary AS pass through the recovery processor, which serves them in accordance with the method of FIG. 4. Such a configuration is shown in FIG. 1 above. In some embodiments, the functionality of the recovery processor is carried out by a processor of the secondary storage device. In this configuration too, all I/O commands issued by the secondary AS pass through the recovery processor.

In an alternative embodiment, recovery processor 40 forwards the metadata list to secondary storage device 32, and the secondary storage device carries out the method of FIG. 4. In particular, the secondary storage device ignores WRITE commands from recovery processor 40 of data objects whose IDs have already been deleted from the metadata list. In these embodiments, the recovery processor does not have to intercept the I/O commands issued by the secondary AS.

In some embodiments, when the metadata list becomes empty, all I/O commands issued by the secondary AS are served directly from the secondary storage device, without being intercepted or otherwise processed by the recovery processor. This mode switching can be implemented in different ways. For example, mode switching can be performed by software logic in the secondary storage device. This technique is particularly suitable for configurations in which the method of FIG. 4 is carried out by the secondary storage device (e.g., when the recovery processor functionality is implemented in the secondary storage device, or when the recovery processor forwards the metadata list to the secondary storage device).

In an alternative embodiment, a network switch (not shown in the figure) handles the routing and forwarding of data between the secondary AS and the secondary storage device. In these embodiments, the switch can be initially configured to forward the I/O commands from the secondary AS to the recovery processor. When the metadata list becomes empty, the switch can be reconfigured to forward the I/O commands directly to the secondary storage device without involving the recovery processor. This technique is particularly suitable for configurations in which the recovery processor is connected between the secondary AS and the secondary storage device. Typically, reconfiguration of the switch is performed by the recovery processor. Alternatively, however, reconfiguration can be performed by any other element of system 20 that has access to the metadata list, such as by the secondary storage device or the disaster-proof storage unit.

In some implementations, WRITE I/O commands issued by the secondary AS can be served before the metadata list is fully received at the secondary site, and even before the metadata list is transmitted. In some embodiments, the recovery processor records the object IDs of such WRITE commands in a separate temporary list, referred to as a "recoded list." When the metadata list becomes available, the recovery processor deletes from the metadata list every object ID that also appears in the recoded list. A READ command issued by the secondary AS is served only after the metadata list is available, unless this operation has the same object ID as one of the IDs in the recoded list.

The methods and systems described herein considerably reduce the data recovery time following disaster events, since serving I/O commands can begin as soon as the metadata list is received at the secondary site, and sometimes even earlier. Consider the example given above, of a system having a storage I/O rate of 200 MBps and a disaster-proof unit that transmits over a 384 Kbps wireless link. In this system, five seconds of storing write operations generates 1 GB of data. Transmitting the entire 1 GB data over the 384 Kbps link would require approximately six hours.

When using the disclosed methods, on the other hand, the recovery time is reduced considerably. Assuming WRITE operations of 512 bytes each, the metadata list comprises 2 Million entries. Assuming each entry is eight bytes long, the overall size of the metadata list is 16 MB. Transmitting this metadata list over the 384 Kbps link would take approximately six minutes instead of six hours.

Exemplary Data Structures and Pseudo-Code

The following text provides an example of data structures and pseudo-code that can be used to implement the methods described herein. The following data structures are referred to in the pseudo-code sections below:

data_object: A disk block of 512 bytes.

object_unique_ID: A block address consisting of the tuple <unique_volume_ID, block_offset>.

unique_volume_ID denotes the ID of the storage volume in which the corresponding data_object is located, as specified in the Small Computer Systems Interface (SCSI) standard. block_offset denotes the offset specified in SCSI READ and WRITE commands of the data_object to that volume.

I/O: A tuple of <operation, object_unique_ID>. operation may comprise either READ or WRITE. object_unique_ID denotes the object on which the operation is preformed.

metadata[1:n]: An array of object_unique_IDs in order of their creation times. The value of n is set to the size of the memory of the disaster-proof unit, divided by 512 (assuming 512-byte data objects).

volume_mapping: A tuple <p_volume_ID, s_volume_ID>, wherein p_volume_ID denotes the unique ID of a primary volume and s_volume_ID denotes the unique ID of its corresponding secondary mirror volume.

replication_mapping[1:m]: An array containing tuples volume_mappings for all volumes participating in a replication. m denotes the number of volumes in the replication scheme.

The recovery procedure described below consists of two concurrent tasks: (1) the task of processing I/O commands issued by the application servers, and (2) the data recovery task. In addition, pseudo-code of procedures for extracting mirror object unique IDs from the corresponding object unique IDs and vice versa are also presented.

```
Extracting Mirror Object Unique ID
find_mirror_object_unique_ID(primary_object_unique_ID)
{
  FOR every entry in replication_mapping DO
    IF volume_mapping:p_volume_ID =
      primery_object_unique_ID:unique_volume_ID THEN
      RETURN
      {
        mirror_object_unique_ID:unique_volume_ID=
          volume_mapping:s_volume_ID
        mirror_object_unique_ID:block_offset=
          primary_object_unique_ID:block_offset
      }
}
Extracting Object Unique ID
find_object_unique_ID(mirror_object_unique_ID)
{
  FOR every entry in replication_mapping DO
    If volume_mapping:s_volume_ID=
      mirror_object_unique_ID:unique_volume_ID THEN
      RETURN
      {
        object_unique_ID:unique_volume_ID=
          volume_mapping:p_volume_ID
        object_unique_ID:block_offset=
          mirror_object_unique_ID:block_offset
      }
}
Application Server I/O Processing
FOR every I/O command WHILE metadata not empty DO
{
  IF I/O:object_unique_ID not in metadata THEN
    execute I/O
  ELSE
    IF I/O:operation=read THEN
      Request over wireless link from
      disaster-proof unit the most recent
      version of object with
```

```
      object_unique_ID=I/O:object_unique_ID
      FOR all I/O:object_unique_ID in
         metadata DO
            Remove I/O:object_unique_ID from
               metadata
      IF I/O:operation=write THEN
      {
         Execute the write operation
         FOR all I/O:object_unique_ID in
            metadata DO
               Remove I/O:object_unique_ID from
                  metadata
         }
      }
Data Recovery
FOR every unique_object_ID in metadata WHILE metadata not
empty DO
{
   Get next unique_object_ID from metadata
   Get from disaster-proof unit over wireless link a
   data object corresponding to the unique_object_ID
   Write the data_object to the corresponding location
   at secondary storage device
   Remove unique_object_ID from metadata
}
```

The embodiments described herein refer mainly to a "pull" configuration, in which the recovery processor proactively requests the disaster-proof storage unit to transmit the desired data objects. Alternatively, the methods and systems described herein may be applied in a "push" configuration, in which the disaster-proof storage unit autonomously transmits the cached data objects to the recovery processor. In these embodiments, the recovery processor may request the disaster-proof storage unit to stop transmitting the cached data objects when the metadata list becomes empty. The recovery processor may also send such a request to the disaster-proof storage unit in configurations in which the metadata list is delegated and managed by the secondary storage device.

The embodiments described herein refer to storage devices, sites and application servers as being "primary" or "secondary." In some systems, however, the primary and secondary roles of these elements may be reversed. In other words, a given data source, storage device or site may serve a primary role at a certain point in time, and a secondary role at a different time. For example, when a disaster event hits a site that currently serves as the primary site, data recovery is carried out by the site that currently serves as the secondary site. Following recovery, the roles may be reversed, and the site that previously played the role of the secondary site may begin to function as the primary site. The site that was previously hit by the disaster may begin to serve as the secondary site.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A data processing method, comprising:
receiving data objects from a data source for storage by a primary storage device;
caching a respective first instance of each of at least some of the received data objects in a disaster-proof storage unit that is collocated with the primary storage device, and sending a respective second instance of each received data object for storage in a secondary storage device that is remote from the primary storage device;
sending from the disaster-proof storage unit to the remote secondary storage device a list of respective identifiers of the data objects that are cached in the disaster-proof storage unit at a given point in time;
following an event that renders at least some of the data objects on the primary storage device inaccessible at the given point in time, receiving a request sent to the secondary storage device to access a given data object; and
choosing, at the secondary storage device, responsively to the list, to serve either the cached first instance or the stored second instance of the given data object in response to the request.

2. The method according to claim 1, wherein sending the list comprises transmitting the list to the secondary storage device over a wireless link.

3. The method according to claim 1, wherein choosing to serve the first or second instance comprises serving the second instance responsively to verifying that the given data object does not appear in the list.

4. The method according to claim 1, wherein choosing to serve the first or second instance comprises serving the second instance responsively to verifying that the given data object appears in the list and that the request specifies storage of the given data object.

5. The method according to claim 1, wherein choosing to serve the first or second instance comprises serving the first instance cached in the disaster-proof storage unit responsively to verifying that the given data object appears in the list and that the request specifies retrieval of the given data object.

6. The method according to claim 5, wherein serving the first instance comprises requesting the disaster-proof storage unit to send the cached first instance to the secondary storage device with high priority.

7. The method according to claim 5, wherein the disaster-proof storage unit stores multiple first instances of the given object having respective creation times, and wherein serving the first instance comprises serving the first instance whose creation time is most recent among the multiple first instances.

8. The method according to claim 1, wherein, when the request specifies storage of the given data object, choosing to serve the first or second instance comprises storing the given data object in the secondary storage device before fully receiving the list, temporarily recording an identifier of the given data object, and, upon fully receiving the list, deleting the identifier from the list.

9. The method according to claim 1, and comprising sending the cached first instances to the secondary storage device after sending the list.

10. The method according to claim 9, wherein choosing to serve the first or second instance is performed before all the cached first instances are received at the secondary storage device.

11. The method according to claim 9, and comprising deleting all the identifiers pertaining to a certain data object from the list responsively to receiving the respective first instance of the certain data object from the disaster-proof storage unit.

12. The method according to claim 1, and comprising deleting the given data object from the list after serving the chosen instance.

13. The method according to claim 1, and comprising configuring an unconditional setting to serve the stored second instance responsively to verifying that the list is empty.

14. The method according to claim 13, wherein configuring the unconditional setting comprises configuring a network switch to permanently forward requests to the secondary storage device.

15. The method according to claim 1, wherein sending the list comprises producing the list responsively to the event.

16. The method according to claim 1, wherein sending the list comprises updating the list before the event responsively to caching additional first instances.

17. Apparatus for data processing, comprising:
a mirroring processor, which is configured to receive data objects from a data source, to send respective first instances of the received data objects for storage in a primary storage device and to send respective second instances of the received data objects for storage in a secondary storage device that is remote from the primary storage device;
a disaster-proof storage unit, which is collocated with the primary storage device and is coupled to cache the respective first instance of each of at least some of the received data objects and to send to the remote secondary storage device a list of respective identifiers of the data objects that are cached in the disaster-proof storage unit at a given point in time; and
a recovery processor, which is configured, following an event that renders at least some of the data objects on the primary storage device inaccessible at the given point in time, to receive a request sent to the secondary storage device to access a given data object and to choose, responsively to the list, to serve either the cached first instance or the stored second instance of the given data object in response to the request.

18. The apparatus according to claim 17, wherein the disaster-proof storage unit is coupled to transmit the list to the secondary storage device over a wireless link.

19. The apparatus according to claim 17, wherein the recovery processor is configured to serve the second instance responsively to verifying that the given data object does not appear in the list.

20. The apparatus according to claim 17, wherein the recovery processor is configured to serve the second instance responsively to verifying that the given data object appears in the list and that the request specifies storage of the given data object.

21. The apparatus according to claim 17, wherein the recovery processor is configured to serve the first instance cached in the disaster-proof storage unit responsively to verifying that the given data object appears in the list and that the request specifies retrieval of the given data object.

22. The apparatus according to claim 21, wherein the recovery processor is configured to request the disaster-proof storage unit to send the cached first instance with high priority.

23. The apparatus according to claim 21, wherein the disaster-proof storage unit is coupled to cache multiple first instances of the given object having respective creation times, and to serve the first instance whose creation time is most recent among the multiple first instances.

24. The apparatus according to claim 17, wherein, when the request specifies storage of the given data object, the recovery processor is configured to store the given data object in the secondary storage device before fully receiving the list, to temporarily record an identifier of the given data object, and, upon fully receiving the list, to delete the identifier from the list.

25. The apparatus according to claim 17, wherein the disaster-proof storage unit is coupled to send the cached first instances to the secondary storage device after sending the list.

26. The apparatus according to claim 25, wherein the recovery processor is configured to choose to serve the first or second instance before all the cached first instances are received at the secondary storage device.

27. The apparatus according to claim 25, wherein the recovery processor is configured to delete all the identifiers pertaining to a certain data object from the list responsively to receiving the respective first instance of the certain data object from the disaster-proof storage unit.

28. The apparatus according to claim 17, wherein the recovery processor is configured to delete the given data object from the list after serving the chosen instance.

29. The apparatus according to claim 17, wherein the recovery processor is configured to configure an unconditional setting to serve the stored second instance responsively to verifying that the list is empty.

30. The apparatus according to claim 29, wherein the recovery processor is configured to configure the unconditional setting by configuring a network switch to permanently forward requests to the secondary storage device.

31. The apparatus according to claim 17, wherein the disaster-proof storage unit is coupled to produce the list responsively to the event.

32. The apparatus according to claim 17, wherein the disaster-proof storage unit is coupled to update the list before the event responsively to caching additional first instances.

33. Apparatus for data processing, comprising:
a mirroring processor, which is configured to receive data objects from a data source, to send respective first instances of the received data objects for storage in a primary storage device and to send respective second instances of the received data objects for storage in a secondary storage device that is remote from the primary storage device;
a disaster-proof storage unit, which is collocated with the primary storage device and is coupled to cache the respective first instance of each of at least some of the received data objects and to transmit a list of respective identifiers of the data objects that are cached in the disaster-proof storage unit at a given point in time; and
a recovery processor, which is configured, following an event that renders at least some of the data objects on the primary storage device inaccessible at the given point in time, to receive the list from the disaster-proof storage unit and to forward the list to the secondary storage device, so as to enable the secondary storage device to choose, responsively to the list, to respond to a request to access a given data object by serving either the cached first instance or the stored second instance of the given data object.

34. A system, comprising:
a data source;
a primary storage device;
a secondary storage device that is remote from the primary storage device;
a mirroring processor, which is configured to receive data objects from the data source, to send respective first instances of the received data objects for storage in the primary storage device and to send respective second instances of the received data objects for storage in the secondary storage device;
a disaster-proof storage unit, which is collocated with the primary storage device and is coupled to cache the respective first instance of each of at least some of the received data objects and to send to the remote secondary storage device a list of respective identifiers of the data objects that are cached in the disaster-proof storage unit at a given point in time; and a recovery processor, which is configured, following an event that renders at least some of the data objects on the primary storage device inaccessible at the given point in time, to receive a request sent to the secondary storage device to access a given data object and to choose, responsively to the list, to serve either the cached first instance or the stored second instance of the given data object in response to the request.

35. A computer software product for data processing, for use in a system that receives data objects from a data source, sends respective first instances of the data objects for storage in a primary storage device and respective second instances of the data objects for storage in a secondary storage device that is remote from the primary storage device, the system further including a disaster-proof storage unit, which is collocated with the primary storage device and caches the respective first instance of each of at least some of the received data objects and sends to the remote secondary storage device a list of respective identifiers of the data objects that are cached in the disaster-proof storage unit at a given point in time, the product comprising a tangible non-transitory computer-readable storage medium, in which program instructions are stored, which instructions, when read by a computer, cause the computer, following an event that renders at least some of the data objects on the primary storage device inaccessible at the given point in time, to receive a request sent to the secondary storage device to access a given data object and to choose, responsively to the list, to serve either the cached first instance or the stored second instance of the given data object in response to the request.

* * * * *